United States Patent
Wei

(10) Patent No.: US 9,585,094 B2
(45) Date of Patent: Feb. 28, 2017

(54) APPARATUS AND METHOD FOR CONTROLLING CELL DENSITY, CELL CONTROLLING APPARATUS AND WIRELESS COMMUNICATION SYSTEM

(71) Applicant: Sony Corporation, Minato-ku (JP)

(72) Inventor: Yuxin Wei, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/487,395

(22) Filed: Sep. 16, 2014

(65) Prior Publication Data

US 2015/0148025 A1    May 28, 2015

(30) Foreign Application Priority Data

Nov. 26, 2013    (CN) .......................... 2013 1 0611203

(51) Int. Cl.
*H04M 3/00*    (2006.01)
*H04W 52/02*    (2009.01)
*H04W 16/08*    (2009.01)

(52) U.S. Cl.
CPC ......... *H04W 52/0206* (2013.01); *H04W 16/08* (2013.01); *Y02B 60/50* (2013.01)

(58) Field of Classification Search
CPC .......................... H04W 52/0206; H04W 16/10
USPC ......................................... 455/418
See application file for complete search history.

(56) References Cited

U.S. PATENT DOCUMENTS

2006/0079265 A1*  4/2006 Masuda ................. 455/522
2014/0364127 A1* 12/2014 Yin .................. H04W 52/0206
                                                455/438
2015/0111594 A1*  4/2015 Cui et al. ................. 455/453

* cited by examiner

*Primary Examiner* — Tanmay Shah
(74) *Attorney, Agent, or Firm* — Oblon, McClelland, Maier & Neustadt, L.L.P.

(57) ABSTRACT

The disclosure relates to an electronic device, method for controlling cell density in a wireless communication system and a non-transitory computer readable medium. The electronic device includes a circuitry configured to determine a target density of cells and a target energy efficiency based on current network status. The circuitry is further configured to control adjusting operating states of a plurality of cells to fit the target density of cells. A current density of cells of the plurality of cells is different with the target density of cells.

20 Claims, 9 Drawing Sheets

APPARATUS AND METHOD FOR CONTROLLING CELL DENSITY, CELL CONTROLLING APPARATUS AND WIRELESS COMMUNICATION SYSTEM

FIELD

The present disclosure generally relates to the field of wireless communication, and more particularly to an apparatus and method for controlling cell density in a wireless communication system, an apparatus for controlling operating state switching of a cell and a wireless communication system including the apparatuses described above.

BACKGROUND

Recently, the sustainable development strategy based on green energy conservation technology has become a general consensus of national governments, business circles and academia. While the growing communication technology brings convenience for people's life, the proportion of carbon component to the global greenhouse gas emission is not small due to the power consumption of the core network apparatus, the access network apparatus and the terminal for supporting communication, where the power consumption of the base station takes 60% to 70% of that of the whole communication system. It is desirable to reduce the power consumption of the communication system from the view of energy saving. On the other hand, the power consumption should not be reduced at the expense of a significant reduction in the user communication quality. Therefore, it becomes a key problem how to improve the energy efficiency of the base station apparatus. The cell density, as a key indicator for the network planning, has a vital effect on the energy efficiency of the whole communication system.

SUMMARY

A brief overview of the present disclosure is given hereinafter to provide the basic understanding to some aspects of the present disclosure. It should be understood that, the overview is not an exhaustive overview of the present disclosure, which is neither intended to determine the key or important part of the present disclosure, nor intended to define the scope of the present disclosure. The object of the overview is only to give some conceptions in a simplified form, which can be used as a preface of the more detailed description to be discussed subsequently.

According to an embodiment of the present disclosure, an apparatus for controlling cell density in a wireless communication system is provided, the apparatus including: a system-energy-efficiency-measurement determining device, configured to, in accordance with a current network state of the wireless communication system, make a dynamic selection from at least two system energy efficiency measurements for measuring system energy efficiency of the wireless communication system, so as to determine a system energy efficiency measurement suitable for the wireless communication system; a target-density determining device, configured to determine a target density of cells in the wireless communication system in accordance with the determined system energy efficiency measurement, wherein with the system energy efficiency measurement, the system energy efficiency of the target density is higher than the current system energy efficiency; and a adjustment indicating device, configured to initiate a process for adjusting cell operating state, such that the density of cells in service in the adjusted system approaches the determined target density.

According to another embodiment of the present disclosure, a method for controlling cell density in a wireless communication system is provided, the method including steps of: dynamically selecting, in accordance with a current network state of the wireless communication system, from at least two system energy efficiency measurements for measuring system energy efficiency of the wireless communication system, to determine a system energy efficiency measurement suitable for the wireless communication system; determining a target density of cells in the wireless communication system in accordance with the determined system energy efficiency measurement, wherein with the system energy efficiency measurement, system energy efficiency of the target density is higher than the current system energy efficiency; and initiating a process for adjusting cell operating state, such that the density of cells in service in the adjusted system approaches the determined target density.

According to yet another embodiment of the present disclosure, an apparatus for controlling operating state switching of a cell is provided, the apparatus including: a communication device configured to receive an indication for adjusting the operating state of a cell from the above-mentioned apparatus for controlling cell density in a wireless communication system; and a control device configured to switch the operating state of a corresponding cell in accordance with the indication for adjusting the operating state of the cell.

According to yet another embodiment of the present disclosure, a wireless communication system is provided, the system including: the above-mentioned apparatus for controlling cell density in a wireless communication system; and the above-mentioned apparatus for controlling operating state switching of a cell.

According to yet another embodiment of the present disclosure, an electronic device is provided. The electronic device includes a circuitry configured to determine a target density of cells and a target energy efficiency based on current network status. The circuitry is further configured to control adjusting operating states of a plurality of cells to fit the target density of cells. Wherein a current density of cells of the plurality of cells is different with the target density of cells.

According to yet another embodiment of the present disclosure, a method for controlling cell density in a wireless communication system is provided. The method includes the step of determining a target density of cells and a target energy efficiency based on current network status. The method further includes the step of controlling adjusting operating states of a plurality of cells to fit the target density of cells. Wherein a current density of cells of the plurality of cells is different with the target density of cells.

According to yet another embodiment of the present disclosure, a non-transitory computer readable medium is provided. The non-transitory computer readable medium includes program codes thereon. When executed by a processor of the computer, the program codes cause the processor to perform the steps of determining a target density of cells and a target energy efficiency based on current network status, and controlling adjusting operating states of a plurality of cells to fit the target density of cells. Wherein a current density of cells of the plurality of cells is different with the target density of cells.

With the apparatus and method according to the embodiments of the present disclosure, it is possible to reduce the power consumption of the wireless communication system while ensuring the service quality for the user by rationally adjusting the cell density.

BRIEF DESCRIPTION OF THE DRAWINGS

The present disclosure will be better understood with reference to the following description given in conjunction with the drawings. In the drawings, the same or similar reference numerals indicate the same or similar components. The drawings and the following detailed description are included in the specification to form a part of the present disclosure, and are used to further illustrate the preferred embodiments of the present disclosure by way of example and explain the principles and advantages of the present disclosure. In the drawings.

DETAILED DESCRIPTION

Figure 1:
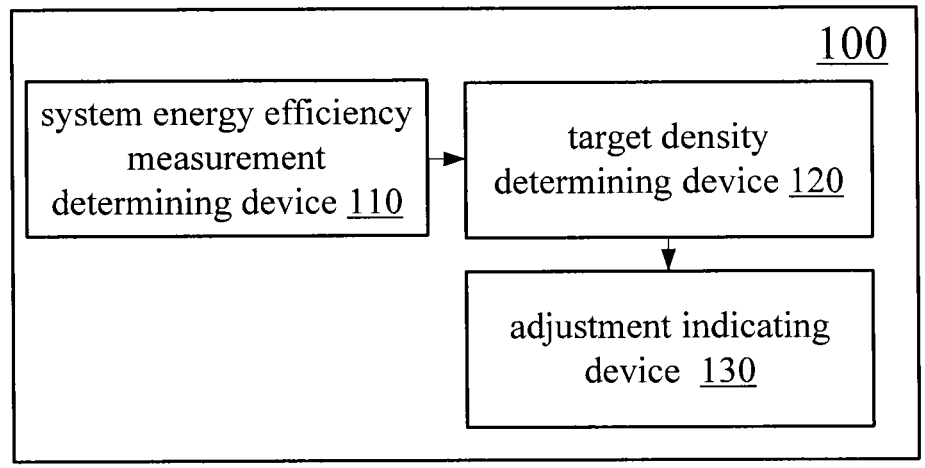
FIG. 1 is a block diagram illustrating a configuration example of an apparatus for controlling cell density in a wireless communication system according to an embodiment of the present disclosure.

The embodiments of the invention will be described hereinafter with reference to the drawings. Elements and features described in one drawing or embodiment of the present disclosure can be combined with elements and features described in another drawing or embodiment of the present disclosure. It should be noted that, for purposes of clarity, representations and descriptions on components and processes that are unrelated to the present disclosure and that have been known to those skilled in the art are omitted in the drawings and descriptions.

As illustrated in FIG. 1, an apparatus 100 for controlling cell density in a wireless communication system according to an embodiment of the present disclosure includes a system-energy-efficiency-measurement determining device 110, a target-density determining device 120 and adjustment indicating device 130.

The system-energy-efficiency-measurement determining device 110 is configured to, in accordance with a current network state of the wireless communication system, make a dynamic selection from at least two system energy efficiency measurements for measuring system energy efficiency of the wireless communication system, so as to determine a system energy efficiency measurement suitable for the wireless communication system.

Various energy efficiency measurements may be used to measure the energy efficiency of a system. For example, EPB (energy per bit) or PPA (power per area) may be selected as the energy efficiency measurement. EPB refers to energy consumed per bit in the communication transmission provided by the system. EPB may be calculated by dividing a total power consumption of the system by an overall communication throughout of the system. PPA refers to energy consumed per covering area served by the system. PPA may be calculated by dividing a total power consumption of the system by an overall area covered by the system. Moreover, other energy efficiency measurement may be selected, such as average power consumption for each user served by the system and the like.

Although various energy efficiency measurements may be used to measure the energy efficiency of the system, an energy efficiency measurement may be selected corresponding to different system operating state and different service requirement, to provide an energy efficiency indicator more suitable for the system operating state and the service requirement.

For example, the inventor of the present disclosure realized that in the case that the network is busy, it is desirable to transfer bits as many as possible with as little energy as possible. In this case, it is rational to select EPB to measure the system energy efficiency. However, in the case that the load of the network is light, the overall flow rate of the system is low, but it does not mean that the energy efficiency is high. It is desired to cover as large area as possible with as little transfer energy as possible. Therefore, in the case that the load of the network is light, PPA is more suitable to be selected as the energy efficiency indicator than EPB.

Therefore, according to an embodiment of the present disclosure, the system-energy-efficiency-measurement determining device 110 selects the system energy efficiency measurement in accordance with the current network state, so as to determine an energy efficiency indicator more suitable for the current network state, to be used for subsequently determining an optimization target for the cell density. The energy efficiency measurement may be dynamically selected according to the real-time variation of the network state, so as to be able to update the optimization target for the cell density in time and perform the corresponding adjustment.

According to one embodiment, the network state on which the system-energy-efficiency-measurement determining device 110 is based includes a parameter reflecting the busyness degree of the network. For example, the network state may include at least one of: network capacity, network error rate, frame usage rate and user density. High network capacity, high network error rate, high frame usage rate and high user density indicate high busyness degree of the network. Low network capacity, low network error rate, low frame usage rate and low user density indicate low busyness degree of the network.

According to one embodiment, the system-energy-efficiency-measurement determining device may be configured to select EPB as the system energy efficiency measurement when busyness degree of the network is higher than a predetermined level. For example, EPB is selected in the case that the network capacity, the network error rate, the frame usage rate or the user density is higher than a corresponding predetermined threshold. In addition, the system-energy-efficiency-measurement determining device may be configured to select PPA as the system energy efficiency measurement when the busyness degree of the network is lower than a predetermined level. For example, PPA is selected in the case that the network capacity, the network error rate, the frame usage rate or the user density is lower than a corresponding predetermined threshold.

In addition, a hysteresis amount may exist between the corresponding predetermined levels of the busyness degree of the network referenced in selecting EPB or PPA as the system energy efficiency measurement, to avoid that the selection made by the system-energy-efficiency-measurement determining device frequently switches between EPB and PPA when a fluctuation of the busyness degree of the network occurs.

The target-density determining device 120 is configured to determine a target density of cells in the wireless communication system in accordance with the system energy efficiency measurement determined by the system-energy-efficiency-measurement determining device 110, wherein with the system energy efficiency measurement, the system energy efficiency of the target density is higher than the current system energy efficiency The "cell density" mentioned herein refers to the density of the cells which are disposed in the wireless communication system and are in an operating state to provide communication service, unless otherwise indicated. The cells to be disposed as hardware facilities are determined in the building and designing phase of the network by the operator, and the solution of the present disclosure is to adjust the density of cells in the operating state by indicating the corresponding cell to adjust its operating state, for example, to be turned on or turned off.

The system energy efficiency is affected by the cell density. When different system energy efficiency measurements are selected, the relations between the cell density and the system energy efficiency are accordingly different. In the case that the system energy efficiency measurement suitable for the current system condition is determined by the system-energy-efficiency-measurement determining device 110, the target-density determining device 120 may determine the target cell density in accordance with the predetermined relation corresponding to the selected system energy efficiency measurement, such that, under the selected energy efficiency measurement, the system energy efficiency is higher than the current system energy efficiency. The relation between the cell density and the system energy efficiency may be, for example, determined in advance according to the manner described in detail hereafter.

The adjustment indicating device 130 is configured to initiate a process for adjusting cell operating state, such that the density of cells in service in the adjusted system approaches the target density determined by the target-density determining device 120.

Here, "approaches a target density" refers to adjusting the current cell density toward the target density, such that the adjusted cell density is closer to the target density than the cell density before the adjustment. According to the actual condition and service requirement of the system (for example, some cells cannot be turned off for some special reason), the determined target cell density may not necessarily be actually achieved by adjusting the operating state of the cells. However, the energy efficiency may be increased as long as the density is closer to the target density than the density before the adjustment.

The process for adjusting the cell operating state initiated by the adjustment indicating device 130 may include: determining the number of the cells needed to be turned off or to be turned on such that the cell density approaches the target density and the specific cells to be turned off or to be turned on; indicating the corresponding cell to switch its operating state. The above-mentioned process for adjusting the cell operating state may be performed by the apparatus 100 for controlling cell density or be performed by another apparatus. In the case that the process for adjusting the cell operating state is performed by another apparatus, the adjustment indicating device 130 may provide the determined target density and the indication for initiating the process for adjusting the cell operating state to the other apparatus.

In addition, the process for adjusting the cell operating state may be implemented by the apparatus 100 for controlling cell density together with another apparatus. For example, the apparatus 100 for controlling cell density may include a device for determining the cell to be turned on or to be turned off (which will be described later). In the case that the cell to be adjusted is determined, the apparatus 100 for controlling cell density may send an indication for adjusting the operating state of the cell to the other apparatus for controlling cell operating state, for example, an apparatus for controlling operating state switching of a cell according to another embodiment of the present disclosure which will be described later, and the other apparatus controls the base station of the corresponding cell, such that the cell density in the system is closer to the target density.

It should be noted that according to some embodiments of the present disclosure, components included in the above-mentioned apparatus 100 for controlling cell density in the wireless communication system may be provided in different entities in a distributed mode. For example, the apparatus 100 may also include an apparatus only for determining the target cell density in the wireless communication system. In other word, the apparatus according to the embodiment of the present disclosure may not include an adjustment indicating device. In this case, the apparatus determines the target cell density by the system-energy-efficiency-measurement determining device and the target-density determining device. The target cell density may be provided to another apparatus, and the process for adjusting cell operating state is initiated by the other apparatus. In this case, an apparatus for indicating the adjustment of cell density is further disclosed in the present disclosure, the apparatus includes: a target density receiving device, configured to receive the target density of the cell in the area to be adjusted from the above-mentioned apparatus 100 for controlling cell density in a wireless communication system; and an adjustment indicating device, configured to initiate the process for adjusting cell operating state, such that the density of the cell in service in the area to be adjusted to be approach the determined target density. The apparatus for indicating adjustment of the cell density may further include a cell-to-be-adjusted determining device, configured to determine a cell to be turned off (for example, according to the number of users, the traffic, the traffic type of each turned on cell and the interference of the turned on cell to a periphery cell) when the received target density is lower than the current cell density, and determine a cell to be turned on (for example, according to the load of the cell in the periphery of each turned off cell and the interference suffered by the cell) when the received target density is higher than the current cell density. Accordingly, the present disclosure further provides an apparatus for controlling operating state switching of a cell, including a communication device configured to receive the indication for adjusting the operating state of a cell from the above-mentioned apparatus for indicating the adjustment of cell density, and a control device configured to switch the operating state of the corresponding cell in accordance with the indication for adjusting the operating state of the cell. The apparatus according to the embodiment of the present disclosure selects a suitable system energy efficiency measurement in accordance with the current network state of the wireless communication system, determines a suitable cell target density accordingly, and adjusts the operating state of the cell in the network, so as to adjust the cell density in a way suitable for the current network state, thereby implementing a more rational optimization of energy saving.

Figure 2:
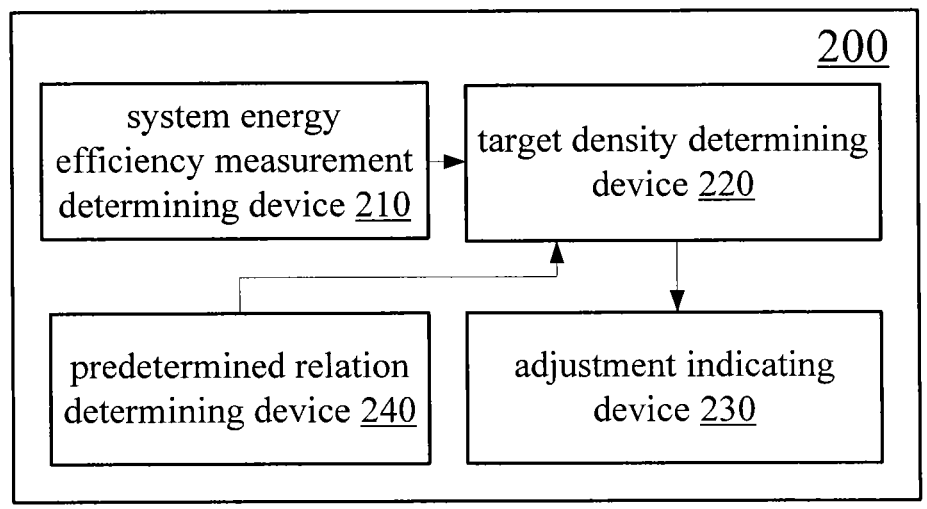
FIG. 2 is a block diagram illustrating a configuration example of an apparatus for controlling cell density in a wireless communication system according to one embodiment of the present disclosure.

Next, an apparatus for controlling cell density in a wireless communication system according to one embodiment of the present disclosure will be explained with reference to FIG. 2.

The apparatus 200 for controlling cell density in a wireless communication system includes a system-energy-efficiency-measurement determining device 210, a target-density determining device 220, an adjustment indicating device 230 and a predetermined-relation determining device 240. The configuration of the system-energy-efficiency-measurement determining device 210 and the adjustment indicating device 230 are similar to the corresponding devices described above in conjunction with FIG. 1, and the detailed description thereof are omitted herein.

The predetermined-relation determining device 240 is configured to determine a predetermined relation between cell density and system energy efficiency based on each of the system energy efficiency measurements.

The target-density determining device 220 is configured to select a corresponding predetermined relation from the predetermined relations determined by the predetermined-relation determining device 240 according to the system energy efficiency measurement determined by the system-energy-efficiency-measurement determining device 210, and calculate, according to the predetermined relation, the cell density with the highest system energy efficiency as the target density.

The predetermined-relation determining device 240 may determine the correspondence between the cell density and the energy efficiency in many ways. For example, the correspondence may be fitted according to the historical data of the actual energy efficiency under different cell densities, or directly take a mapping relation between the historical data of the cell density and energy efficiency as a reference correspondence. A corresponding predetermined relation is determined for each energy efficiency measurement.

Moreover, the predetermined-relation determining device 240 may acquire the predetermined relation between the energy efficiency and the cell density derived by modeling the system. Similarly, a corresponding predetermined relation is determined for each energy efficiency measurement.

As an example, the process for obtaining the predetermined relation between the cell density and the system energy efficiency by modeling the system by a random geometric method will be illustrated in detail.

Assuming that cells in the system employ an isomorphic three-cell cellular network model. The space distribution of the cells is modeled by using isomorphic PPP (Poisson Point Process), which is expressed as PPP($\lambda_m$), wherein $\lambda_m$ is the cell density. The space distribution of the users is also expressed by using isomorphic PPP($\mu_m$), wherein $\mu_m$ is the user density, and W represents the system bandwidth.

The power consumption model of each cell is expressed as the following equation:

$$P_{mp} = a_{mp} P_{mtx} + b_{mp} \quad \text{Equation (1)}$$

$P_{mp}$ is a total amount of the cell power consumption, $a_{mp}$ is a power amplification coefficient, $p_{mtx}$ is an average transmission power, $b_{mp}$ is an offset (which reflects power consumption for signal processing, heat radiation of the station, etc.).

The signal propagation model is as follows:

$$P_{mrx} = d^{-\alpha} h P_{mtx} \quad \text{Equation (2)}$$

$P_{mrx}$ is a power received by the cell, d is a distance from the transceiver, $\alpha$ is a path loss coefficient, and h reflects a multi-pass fading exponent.

Thereby a signal interference noise ratio SINR(u,m) of the user u in the cell m may be defined as $$SINR(u, m) = \frac{P_{mrx}(u, m)}{\sigma^2 + \sum_{y \in S(u)} P_{mrx}(u, n)} \quad \text{Equation (3)}$$

$\sigma$ is a noise.

$P_m$ which is a probability that the data is successfully transferred is defined as a probability that SINR value is greater than a certain threshold, i.e.:

$$P_m = P(SINR(u,m) > t_m) \quad \text{Equation (4)}$$

$t_m$ is a SINR threshold.

The coverage ratio of the cell, CPm, is defined as the cell average ratio with which a target SINR is higher than a certain threshold $t_m$, and it may be determined from the above definition that $CP_m = P_m$.

According to the random geometric theory, the system throughput $C(\lambda_m, \alpha)$ is obtained from Equation (1) as $$C(\lambda_m, \alpha) = W \mu_m E[\ln(1 + SINR)] / \ln 2 \quad \text{Equation (5)}$$
$$= W \frac{1}{\ln 2} \int_{r>0} e^{-\pi \lambda_m r^2} \int_{t>0} e^{-\sigma^2 r^\alpha (e^t - 1)/P_{mtx}}$$
$$Z_{l_r}(r^\alpha (e^t - 1)/P_{mtx}) dt 2\pi \lambda_m r dr$$

-continued $$Z_{t_r}(r^\alpha(e^t-1)/P_{mtx}) =$$
$$\exp\left(-\pi\lambda_m r^2(e^t-1)^{2/\alpha}\int_{(e^t-1)^{-2/\alpha}}^{\infty}\frac{1}{1+x^{\alpha/2}}dx\right)$$

Thereby, the system energy efficiency $EPB(\lambda_m, \alpha)$ may be obtained as $$EPB(\lambda_m, \alpha) = \frac{\lambda_m P_{mp}}{C(\lambda_m, \alpha)} \qquad \text{Equation (6)}$$

$P_m$ is obtained from Equation (2) as $$P_m(\lambda_m, \alpha, t_m) = \frac{1}{1+\rho}\left(1 - \frac{t_m \sigma^2 \Gamma\left(1+\frac{\alpha}{2}\right)}{P_{mtx}(\pi\lambda_m(1+\rho))^{\alpha/2}}\right) + o(\sigma^2) \qquad \text{Equation (7)}$$

$$\Gamma\left(1+\frac{\alpha}{2}\right) = \int_0^\infty x^{\alpha/2} e^{-x} dx, \quad \rho = \int_{t_m^{-2/\alpha}}^\infty \frac{t_m^{2/\alpha}}{1+u^{\alpha/2}} du$$

Thereby, the system energy efficiency $PPA(\lambda_m, \alpha, t_m)$ may be obtained as $$PPA(\lambda_m, \alpha, t_m) = \frac{\lambda_m P_{mp}}{P_m(\lambda_m, \alpha, t_m)} \qquad \text{Equation (8)}$$

Thereby, the correspondence between the system energy efficiency EPB, PPA and the cell density $\lambda_m$ may be obtained. Equation (6) represents the relation between the cell density and the system energy efficiency when EPB is selected as the system energy efficiency measurement, and Equation (8) represents the relation between the cell density and the system energy efficiency when PPA is selected as the system energy efficiency measurement.

The predetermined-relation determining device 240 may acquire the predetermined relation obtained in the way described above. Based on the corresponding predetermined relation (for example, the predetermined relation expressed in equality 6 or equality 8), the target-density determining device 220 may calculate the cell density with the highest system energy efficiency as the target density, in accordance with the energy efficiency measurement, for example, EPB or PPA, determined by the system-energy-efficiency-measurement determining device 210.

Next, the predetermined relation described above is still taken as an example to explain the exemplary way of determining the cell target density according to the predetermined relation.

In the case that EPB is selected as the energy efficiency measurement, the following is defined for the convenience of description:

$$H = W\mu_m \frac{1}{\ln 2}, \quad E(r, t) = 2\pi e^{-\sigma^2 r^\alpha(e^t-1)/P_{mtx}},$$
$$F(r, t) = -\pi r^2\left[1 + (e^t-1)^{2/\alpha}\int_{(e^t-1)^{-2/\alpha}}^{\infty}\frac{1}{1+x^{\alpha/2}}dx\right]$$

Then the system capacity $C(\lambda_m, \alpha)$ may be rewritten as:

$$C(\lambda_m, \alpha) = H\iint_{r>0, t>0} e^{F(r,t)\lambda_m} \cdot \lambda_m \cdot E(r, t) dr dt$$

$$C(\lambda_m, \alpha) = H\iint_{r>0, t>0}\sum_{n=0}^{\infty}\frac{F(r,t)^n \lambda_m^{n+1}}{n!} E(r, t) dr dt$$

$$= H\sum_{n=0}^{\infty}\lambda_m^{n+1}\iint_{r>0, t>0}\frac{F(r,t)^n}{n!} E(r, t) dr dt$$

The derivative of the system capacity $C(\lambda_m, \alpha)$ with respect to $\lambda_m$ is calculated to obtain:

$$\frac{\partial C(\lambda_m, \alpha)}{\partial \lambda_m} = H\sum_{n=0}^{\infty}(n+1)\lambda_m^n \iint_{r>0, t>0}\frac{F(r,t)^n}{n!} E(r, t) dr dt$$

The derivative of $EPB(\lambda_m, \alpha)$ with respect to $\lambda_m$ is calculate to get the value of $\lambda_m$ for obtaining the least $EPB(\lambda_m, \alpha)$, and let the derivative to be 0:

$$\frac{\partial EPB(\lambda_m, \alpha)}{\partial \lambda_m} = \frac{P_{mp} - \lambda_m P_{mp}\frac{\partial C(\lambda_m, \alpha)}{\partial \lambda_m}}{C(\lambda_m, \alpha)^2} = 0$$

Thereby the following is obtained:

$$\sum_{n=0}^{\infty}(n+1)\lambda_m^{n+1}\iint_{r>0, t>0}\frac{F(r,t)^n}{n!} E(r, t) dr dt = 1/(P_{mp}H)$$

To simplify the realization in the project, n=2 may be required, and the optimized cell density $\lambda_{m\_opt}$ may be obtained as:

$$\lambda_{m\_opt} = \frac{-\iint_{r>0,t>0} E(r,t)dr dt + \sqrt{\left(\iint_{r>0,t>0} E(r,t)dr dt\right)^2 + 8\left(\frac{1}{P_{mp}H}\right)\iint_{r>0,t>0} F(r,t)E(r,t)dr dt}}{4\iint_{r>0,t>0} F(r,t)E(r,t)dr dt} \qquad \text{Equation (9)}$$

In addition, when PPA is selected as the system energy efficiency measurement, let $$l = \frac{t_m \sigma^2 \Gamma\left(1+\frac{\alpha}{2}\right)}{P_{mtx}(\pi(1+\rho))^{\alpha/2}}$$

The derivative of $PPA(\lambda_m, \alpha, t_m)$ with respect to $\lambda_m$ is calculated and let the derivative thereof to be 0:

$$\frac{\partial PPA(\lambda_m, \alpha, t_m)}{\partial \lambda_m} = \frac{P_{mp} - \frac{1}{1+\rho}\lambda_m^{-\alpha/2} P_{mp}(\frac{\alpha}{2})l}{\left(\frac{1}{1+\rho}(1 - l\lambda_m^{-\alpha/2})\right)^2} = 0$$

The optimized cell density $\lambda_{m\_opt}$ may be obtained as $$\lambda_{m\_opt} = \left(\left(1 + \frac{\alpha}{2}\right) \cdot l\right)^{\frac{2}{\alpha}} \quad \text{Equation (10)}$$

The target-density determining device 220 may determine, according to the selected energy efficiency measurement, the expected cell density with the highest system energy efficiency according to, for example, Equation (9) or Equation (10).

The present disclosure is not limited to the specific example described above, and the predetermined relation between the cell density and the system energy efficiency may be obtained in other specific way (for example, the way as described in "T. Q. S. Quek, W. C. Cheung, and M. Kountouris. Energy efficiency analysis of two-tier heterogeneous network. European Wireless, April, 2011"), and the target density may be determined according to the predetermined relation.

It can be seen from the example described above that when EPB is selected as the system energy efficiency measurement, the target density is related to the user density $\mu_m$ (which is included in H in Equation (9)) in the system. Accordingly, the target-density determining device may determine the target density of cells according to the user density in the system. When PPA is selected as the system energy efficiency measurement, the target density is related to the SINR threshold $t_m$ (which is included in l in Equation (10)) preset in the system. Accordingly, the target-density determining device may determine the target density of cells according to the SINR threshold preset in the system.

It also can be seen from the example described above that when EPB or PPA is selected as the system energy efficiency measurement, the target density of cells may also be related to the cell transmission power and the path loss coefficient in the system. Accordingly, the target-density determining device may also determine the target density of cells according to the cell transmission power and the path loss coefficient.

Figure 3:
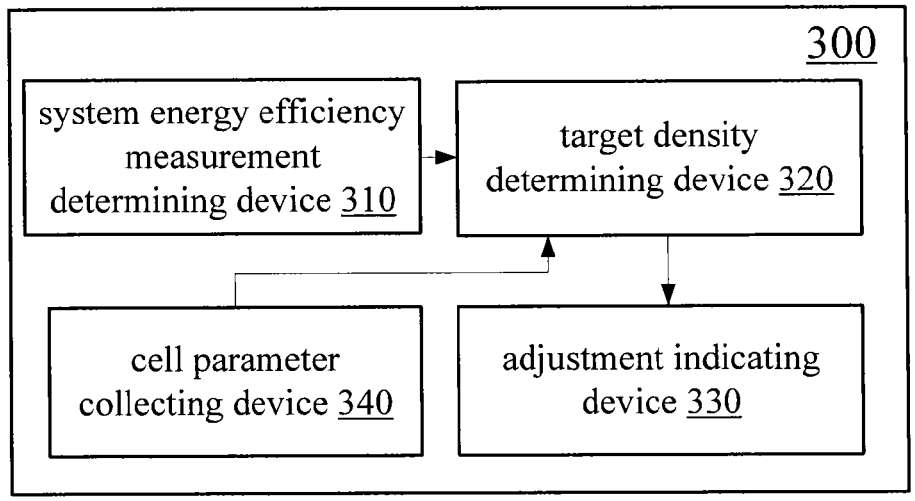
FIG. 3 is a block diagram illustrating a configuration example of an apparatus for controlling cell density in a wireless communication system according to another embodiment of the present disclosure.

As illustrated in FIG. 3, the apparatus 300 for determining a cell density according to an embodiment of the present disclosure includes a system-energy-efficiency-measurement determining device 310, a target-density determining device 320, an adjustment indicating device 330 and a cell-parameter collecting device 340. The configuration of the system-energy-efficiency-measurement determining device 310 and the adjustment indicating device 330 are similar to the corresponding devices described above, and the detailed description thereof are omitted herein.

The cell-parameter collecting device 340 is configured to collect parameters for determining the target density. These parameters may include one or more of the cell transmission power, the user density, the path loss coefficient and the SINR threshold.

Accordingly, the target-density determining device 320 may determine, according to the predetermined relation, the target density based on the parameters collected by the cell-parameter collecting device 340.

The cell-parameter collecting device 340 may collect parameters described above in various ways. For example, the cell-parameter collecting device 340 may acquire the parameters for each cell directly by linking with the cell; or the cell-parameter collecting device 340 may acquire the parameters for each cell reported from the cell.

Similar to the dynamic selection of the system energy efficiency measurement, according to an embodiment of the present disclosure, the target-density determining device may also dynamically update the determined target density according to the current condition of the system. For example, the target-density determining device may be configured to update the target density in a predetermined trigger mode. The trigger mode may include updating periodically and automatically, or updating according to a predetermined instruction.

Accordingly, the adjustment indicating device initiates the process for adjusting cell operating state to approach the updated target density.

Figure 4:
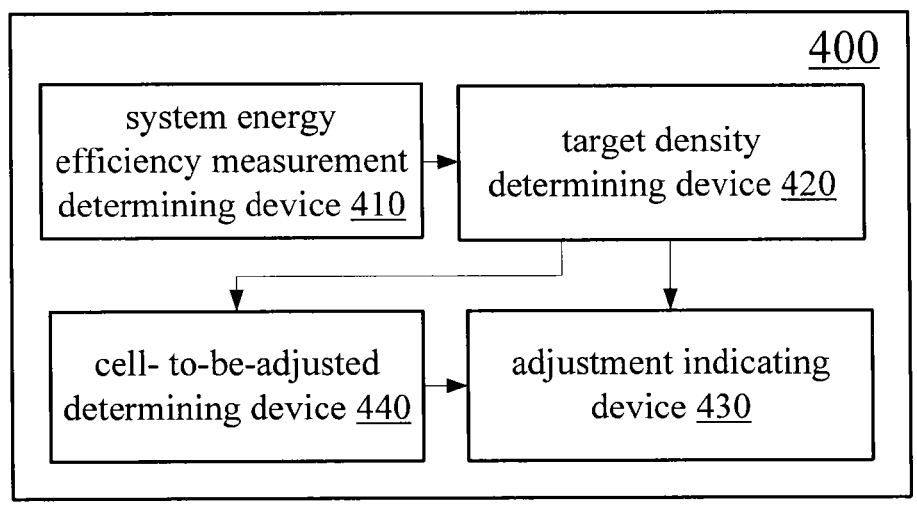
FIG. 4 is a block diagram illustrating a configuration example of an apparatus for controlling cell density in a wireless communication system according to yet another embodiment of the present disclosure.

Next, an apparatus for determining cell density according to an embodiment of the present disclosure will be explained with reference to FIG. 4.

The apparatus 400 for determining cell density includes a system-energy-efficiency-measurement determining device 410, a target-density determining device 420, an adjustment indicating device 430 and a cell-to-be-adjusted determining device 440. The system-energy-efficiency-measurement determining device 410, the target-density determining device 420 and the adjustment indicating device 430 are similar to the corresponding devices described above, and the detailed description thereof are omitted herein.

The cell-to-be-adjusted determining device 440 is configured to determine a cell to be turned off when the determined target density is lower than the current cell density, and determine a cell to be turned on when the determined target density is higher than the current cell density.

Generally, the energy efficiency (such as EPB and PPA) decreases as the cell density increases. However, in some cases, for example, after the cell density is increased to some extent, the energy efficiency may increase as the cell density increases.

The cell-to-be-adjusted determining device 440 may determine a cell to be adjusted according to various specific rules. For example, the cell-to-be-adjusted determining device 440 may determine a cell to be turned off based on the number of the users of the cell when the determined target density is lower than the current cell density. Specifically, a cell with less users may be determined as the cell to be turned off. In addition, other indicators, for example a priority of service, may be taken into account in the determination. Moreover, a cell in an area with higher cell density may be preferably determined as the cell to be turned off.

In the case that the target density is higher than the current cell density, the cell-to-be-adjusted determining device 440 may determine a cell to be turned on according to a factor such as a possible number of the users in the cell in a turned off state and local density of cells. For example, a cell with a larger number of potential users or a cell in an area with lower cell density is preferably determined as a cell to be turned on.

Next, a method for controlling cell density in a wireless communication system according to an embodiment of the present disclosure will be explained.

Figure 5:
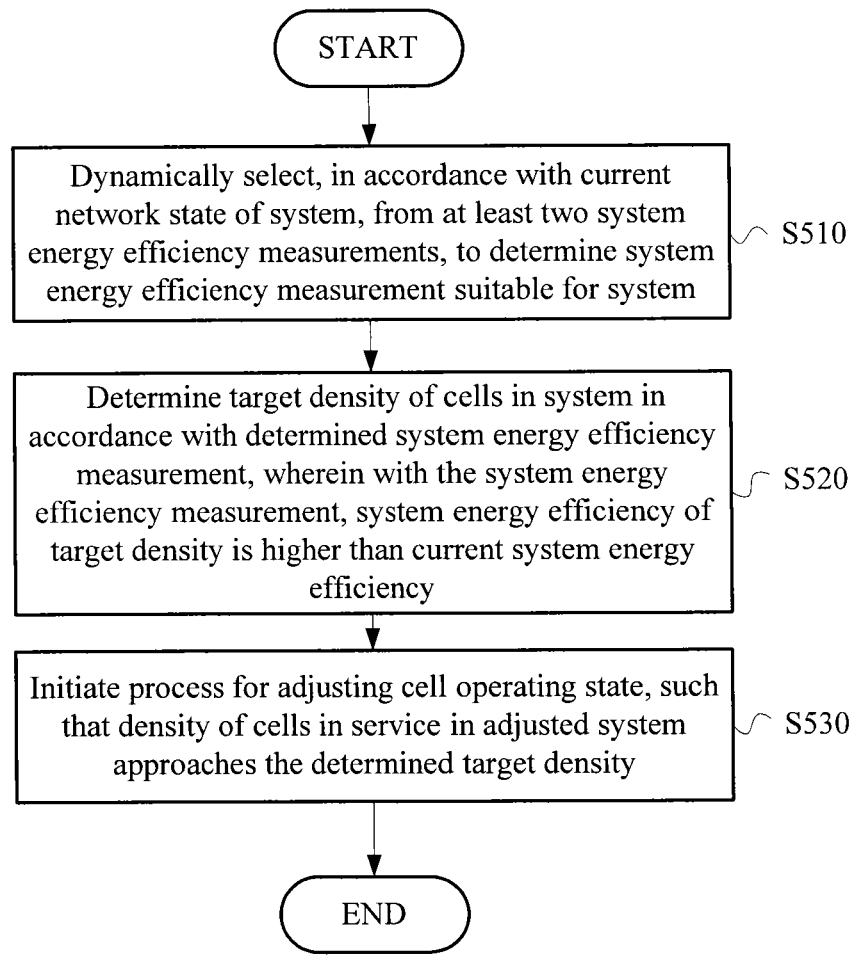
FIG. 5 is a block diagram illustrating a process example of a method for controlling cell density in a wireless communication system according to an embodiment of the present disclosure.

As illustrated in FIG. 5, in step S510, a dynamic selection from at least two system energy efficiency measurements for measuring system energy efficiency of a wireless communication system is made in accordance with a current network state of the wireless communication system to determine a system energy efficiency measurement suitable for the wireless communication system.

As described above, the energy efficiency measurement of the current network state may be selected from the energy per bit, EPB, and the power per area, PPA.

The network state may include an indicator indicating the busyness degree of the network, such as network capacity, network error rate, frame usage rate and user density.

EPB is selected as the system energy efficiency measurement when the busyness degree of the network is higher than a predetermined level, for example, when the network capacity, the network error rate, the frame usage rate or the user density is higher than a corresponding predetermined threshold. Power per area, PPA, is selected as the system energy efficiency measurement when the busyness degree of the network is lower than a predetermined level, for example, when the network capacity, the network error rate, the frame usage rate or the user density is lower than a corresponding predetermined threshold.

As described above, a hysteresis amount may be introduced to avoid the selection frequently switching between EPB and PPA when a fluctuation of the busyness degree of the network occurs.

In step S520, a target density of cells in the system is determined in accordance with the determined system energy efficiency measurement, wherein with the system energy efficiency measurement, the system energy efficiency of the target density is higher than the current system energy efficiency.

In step S530, the above-mentioned process for adjusting cell operating state is initiated, such that the adjusted density of cells in service in system approaches the determined target density.

In the method according to the embodiment of the present disclosure, a suitable cell target density is determined in accordance with the current network state of the wireless communication system, so as to facilitate implementing the optimization of energy saving more rationally.

Figure 6:
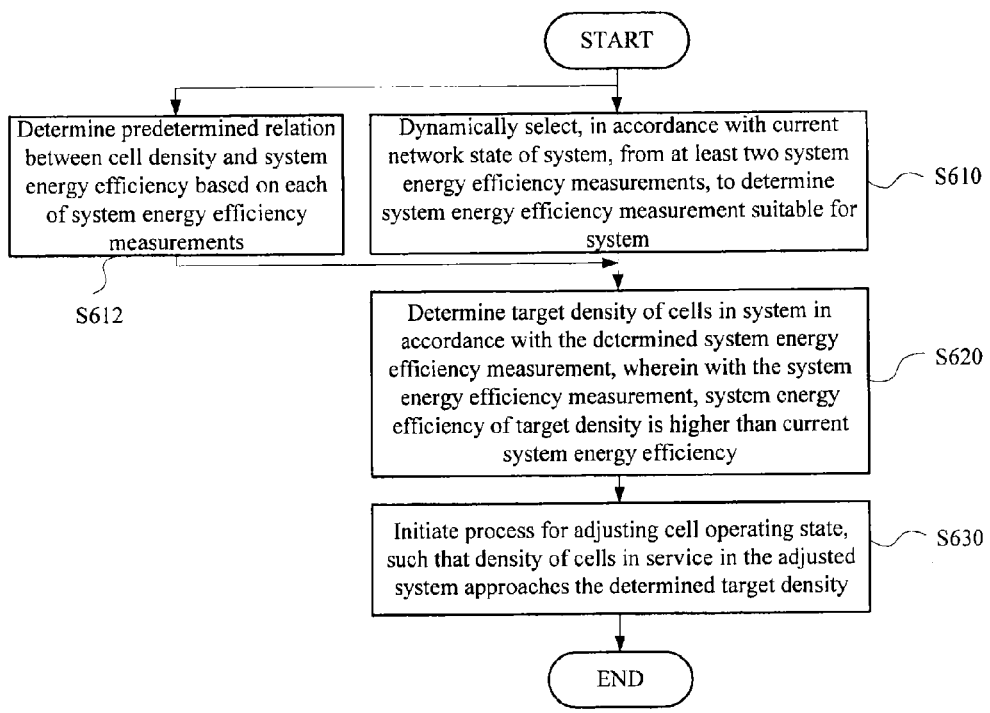
FIG. 6 is a block diagram illustrating a process example of a method for controlling cell density in a wireless communication system according to one embodiment of the present disclosure.

The target density may be determined in accordance with the predetermined relation between the cell density and the system energy efficiency. As illustrated in FIG. 6, a method for determining a cell density according to an embodiment of the present disclosure further includes step S612 of determining a predetermined relation between the cell density and the system energy efficiency based on each of the system energy efficiency measurements.

As described above, the correspondence between the cell density and the energy efficiency may be determined in various ways, for example, by modeling the system as described above (for example, modeling the system via a random geometric method), or fitting the correspondence based on historical data, etc.

Step S612 may be performed before or after step S612 of determining the system energy measurement. Alternatively, step S612 and step S610 may be performed in parallel.

In step S620, the target density of the cells is determined according to the system energy efficiency measurement determined in step S610 and the predetermined relation determined in step S612. The corresponding predetermined relation is selected according to the determined system energy efficiency measurement, and the cell density with the highest system energy efficiency is calculated as the target density according to the predetermined relation.

Specifically, referring to Equation (9) and Equation (10) described above, when EPB is selected as the system energy efficiency measurement, the target density may be determined in accordance with the user density in the system; when EPB is selected as the system energy efficiency measurement, the target density may be determined in accordance with a preset SINR threshold in the system. Moreover, the target density may be determined also in accordance with the cell transmission power and the path loss coefficient in the system.

Next, in step S630, the process for adjusting cell operating state is initiated, such that the density of cells in service in the adjusted system approaches the determined target density.

Figure 7:
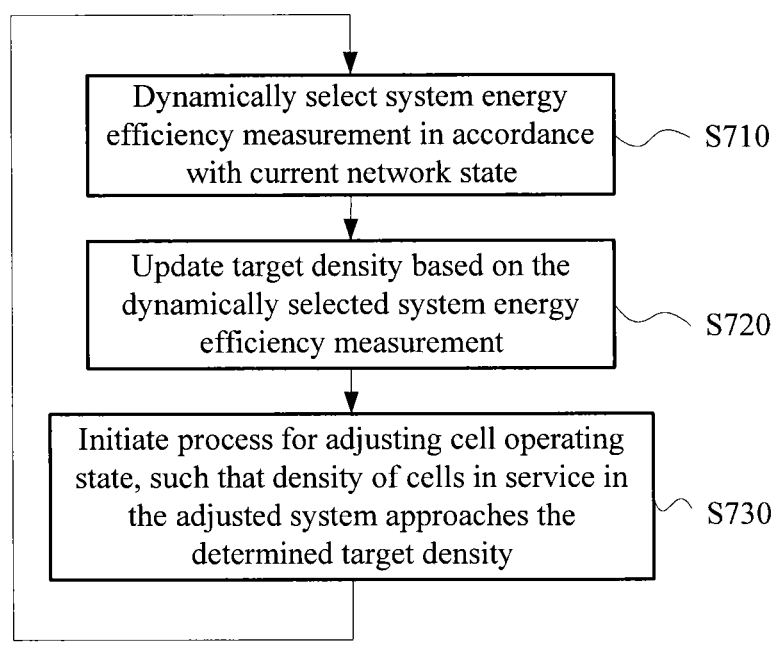
FIG. 7 is a block diagram illustrating a process example of a method for controlling cell density in a wireless communication system according to another embodiment of the present disclosure.

FIG. 7 illustrates an example process of a method for dynamically updating the determined target density according to the embodiment of the present disclosure.

In step S710, the system energy efficiency measurement is selected dynamically in accordance with the current network state. The network state may include the above-mentioned parameters indicating the busyness degree of the network.

In step S720, the target density is updated based on the dynamically selected system energy efficiency measurement.

In step S730, an instruction for adjusting the operating state of a cell in the system is issued so as to achieve the updated target density.

The process in FIG. 7 may be started in a predetermined trigger mode. The trigger mode may include updating periodically and automatically, or updating according to a predetermined instruction.

Figure 8:
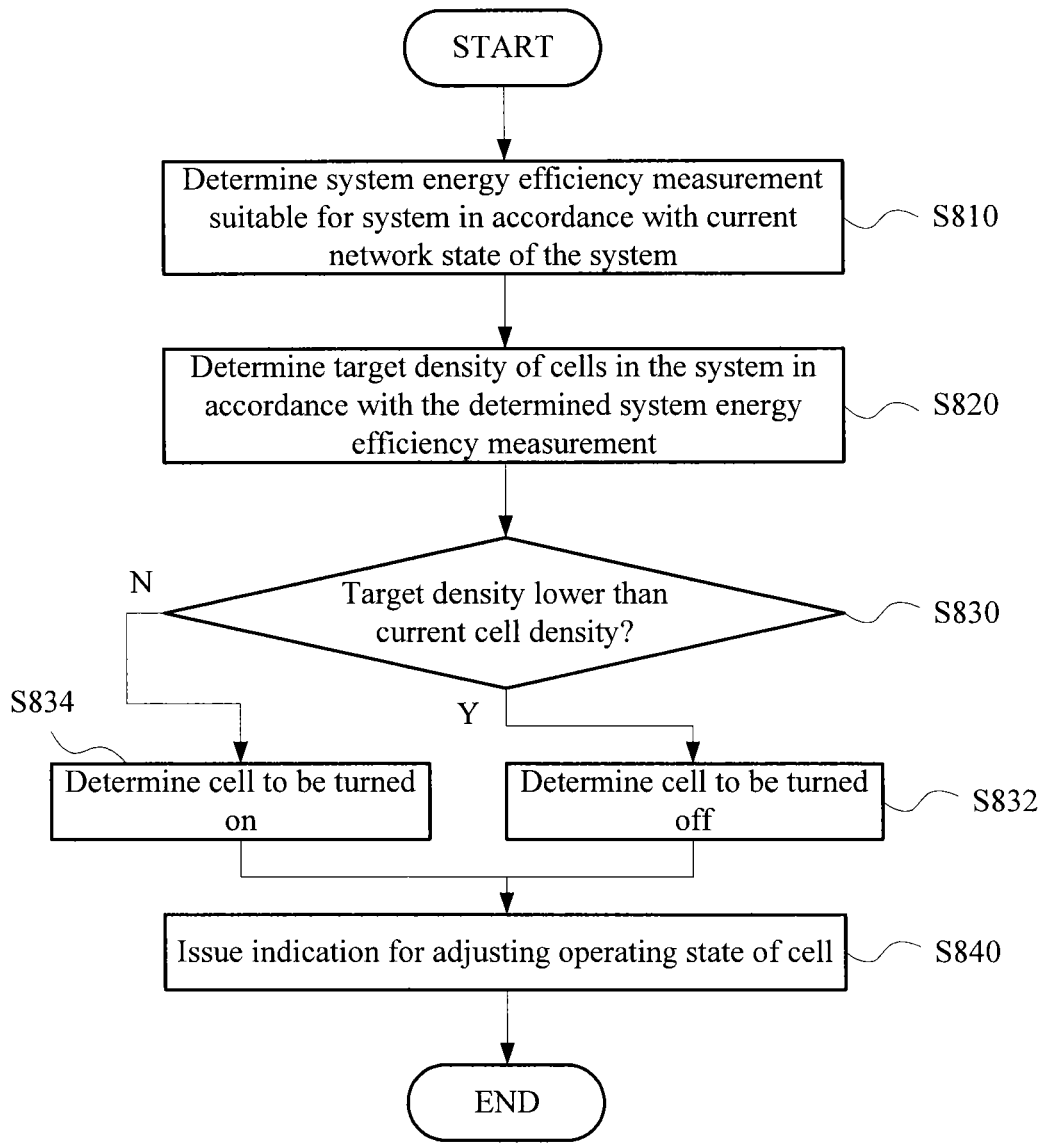
FIG. 8 is a block diagram illustrating a process example of a method for controlling cell density in a wireless communication system according to yet another embodiment of the present disclosure.

FIG. 8 illustrates a process example of the method according to an embodiment of the present disclosure.

In step S810, a system energy efficiency measurement is determined in accordance with the current network state.

In step S820, a target density is determined.

In the case that the target density is lower than the current density ("Y" in step S830), a cell to be turned off is determined (step S832). For example, the cell to be turned off may be determined according to a factor such as the number of the users of the cell, and local density of cells.

In the case that the target density is higher than the current density ("N" in step S830), a cell to be turned on is determined (S834). The cell to be turned on may be determined according to a factor such as the number of the potential users in the cell which is in a turned off state, and local density of cells.

In step S840, an indication for adjusting the operating state of the cell is issued.

An apparatus for controlling operating state switching of a cell is provided according to another aspect of the present disclosure.

Figure 9:
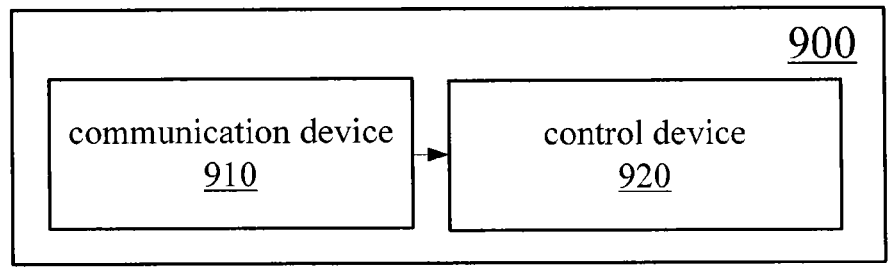
FIG. 9 is a block diagram illustrating a configuration example of an apparatus for controlling operating state switching of a cell according to an embodiment of the present disclosure.

As illustrated in FIG. 9, the apparatus 900 for controlling operating state switching of a cell includes a communication device 910 and a control device 920.

The communication device 910 is configured to receive an indication for adjusting the operating state of a cell from the above-mentioned apparatus for determining cell density according to an embodiment of the present disclosure.

The control device 920 is configured to switch the operating state of a corresponding cell in accordance with the indication for adjusting the operating state of the cell received by the communication device 910.

In some cases, the control device 920 may refuse to adjust the operating state of the corresponding cell, for example, in the case where an indication for turning off a cell is received, but the corresponding cell cannot be turn off (for example, since the user in the cell cannot be switched to another cell), or in the case where an indication for turning on a cell is received, but the corresponding cell cannot be turn on (for example, due to failure or maintenance). In this case, the control device 920 may notify the communication device 910 to feedback the rejection result/reason to the apparatus for determining cell density which sent the indication, such that the apparatus for determining cell density may issue an indication for adjusting the cell operating state for another cell.

Figure 10:
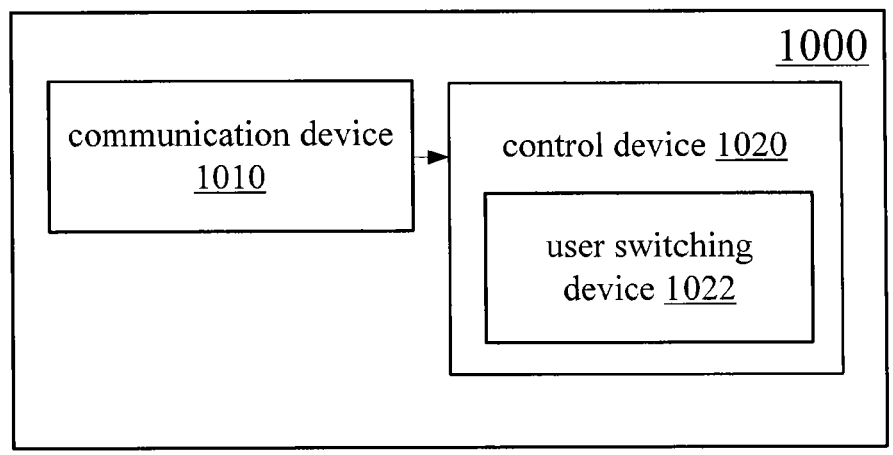
FIG. 10 is a block diagram illustrating a configuration example of an apparatus for controlling operating state switching of a cell according to one embodiment of the present disclosure.

In the case that a cell needs to be turned off, the user in the cell to be turned off should be switched to another cell such that the user may acquire the communication service continuously. Accordingly, as illustrated in FIG. 10, according to an embodiment, an apparatus 1000 for controlling operating state switching of a cell includes a communication device 1010 and a control device 1020. The control device 1020 includes a user switching device 1022 configured to notify the user in the cell to be switched to another cell in the case that an indication for adjusting the operating state of a cell for turning off the corresponding cell is received by the communication device 1010.

In the case that the user in the corresponding cell can be switched to another cell, the control device 1020 may issue to the corresponding cell an indication of turning off the cell after the user switching is completed. In the case that there is a user in the corresponding cell which cannot be switched to another cell, the communication device 1010 may, for example, report to the corresponding apparatus for determining cell density that the cell cannot be turned off, such that the apparatus for determining cell density may issue an indication for adjusting the cell operating state to another cell.

However, in some cases, for example, in the case that an indication to force a cell to be turned off (for example, the system is in urgent need of decreasing power consumption) is received, the control device 1020 may force the corresponding cell to be turned off even if there is a user in the cell who cannot be switched to another cell.

Figure 11:
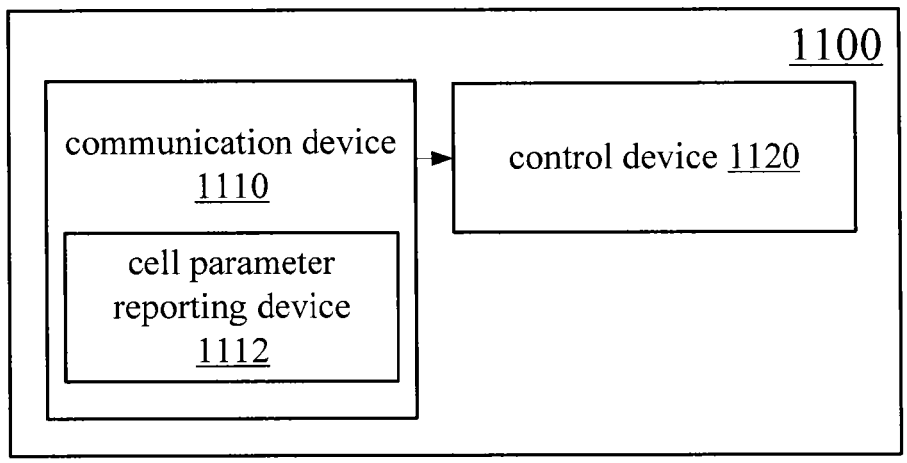
FIG. 11 is a block diagram illustrating a configuration example of an apparatus for controlling operating state switching of a cell according to another embodiment of the present disclosure.

Moreover, the cell parameters used by the apparatus for determining cell density according to the embodiment of the present disclosure to determine the target density may be provided by an apparatus for controlling operating state switching of a cell according to an embodiment of the present disclosure. As illustrated in FIG. 11, according to an embodiment, an apparatus 1100 for controlling operating state switching of a cell includes a communication device 1110 and a control device 1120. The communication device 1110 includes a cell-parameter reporting device 1112 configured to send one or more of transmission power, user density, path loss coefficient and SINR threshold of the cell controlled by the apparatus 1100 to the corresponding apparatus for determining cell density, thereby the corresponding apparatus for determining cell density is able to determine the target density of cells.

Figure 12:
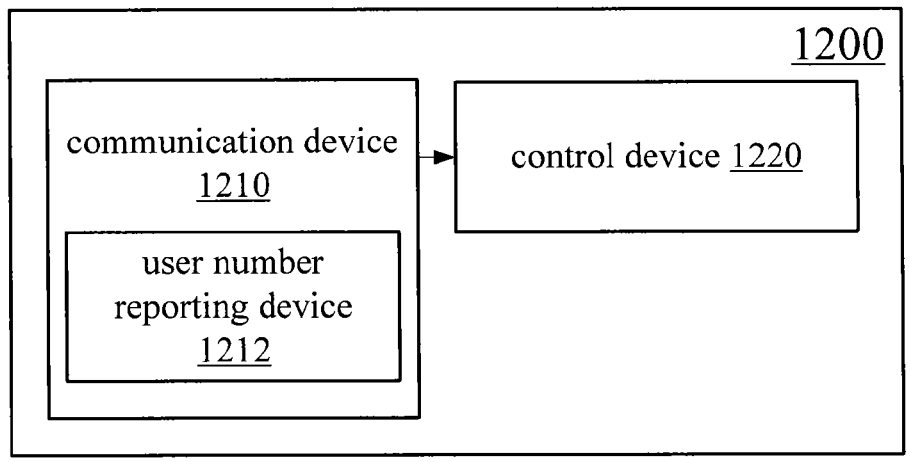
FIG. 12 is a block diagram illustrating a configuration example of an apparatus for controlling operating state switching of a cell according to yet another embodiment of the present disclosure.

In addition, the parameters used by the apparatus for determining cell density according to the embodiment of the present disclosure to determine the cell to be adjusted may be provided by an apparatus for controlling operating state switching of a cell according to an embodiment of the present disclosure. As illustrated in FIG. 12, according to an embodiment, an apparatus 1200 for controlling operating state switching of a cell includes a communication device 1210 and a control device 1220. The communication device 1210 includes a user-number reporting device 1212 configured to send the number of the users of a cell controlled by the apparatus 1200 to the corresponding apparatus for determining cell density, thereby the corresponding apparatus for determining cell density is able to determine the cell to be adjusted by referring to the data.

A wireless communication system is provided according to another aspect of the present disclosure.

Figure 13:
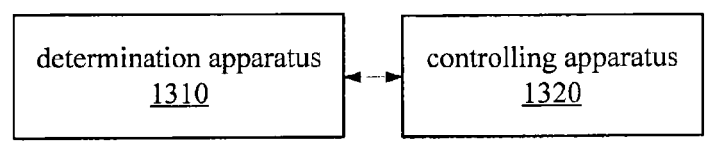
FIG. 13 is a block diagram illustrating a configuration example of a wireless communication system according to an embodiment of the present disclosure.

As illustrated in FIG. 13, the wireless communication system according to an embodiment of the present disclosure includes the above-mentioned apparatus 1310 for determining cell density according to the embodiment of the present disclosure and the above-mentioned apparatus 1320 for controlling operating state switching of a cell according to an embodiment of the present disclosure. The apparatus 1310 determines a target density in accordance with the network state and sends an instruction to the apparatus 1320. The apparatus 1320 controls the corresponding base station according to the received instruction.

The apparatus 1310 for controlling cell density in a wireless communication system and the apparatus 1320 for controlling operating state switching of a cell may be provided in a base station or a core network entity (not shown) in the system. Alternatively, the determination apparatus 1310 may be arranged separately in a core network entity and a base station. For example, the determination apparatus 1310 may be arranged at the core network entity side, and the controlling apparatus 1320 may be arranged at the base station side.

In addition, the system 1300 may include multiple controlling apparatuses 1320 (not shown), which are arranged at each base station respectively (in the case that one control apparatus controls one base station) or arranged at part of base stations (in the case that one control apparatus controls multiple base stations), to receive instructions from the determination apparatus 1310 and control the corresponding one or more base stations.

According to a aspect of the present disclosure, an apparatus for controlling cell density in a wireless communication system is provided.

(1) The apparatus for controlling cell density in a wireless communication system comprising: a system-energy-efficiency-measurement determining device configured to, in accordance with a current network state of the wireless communication system, make a dynamic selection from at least two system energy efficiency measurements for measuring system energy efficiency of the wireless communication system, so as to determine a system energy efficiency measurement suitable for the wireless communication system; target-density determining device configured to determine a target density of cells in the wireless communication system in accordance with the determined system energy efficiency measurement, wherein with the system energy efficiency measurement, the system energy efficiency of the target density is higher than the current system energy efficiency; and an adjustment indicating device configured to initiate a process for adjusting cell operating state, such that the density of cells in service in the adjusted system approaches the determined target density.

(2). The apparatus (1), wherein the at least two system energy efficiency measurements comprise energy per bit EPB and power per area PPA.

(3). The apparatus according to (1) or (2), further comprising a predetermined-relation determining device configured to determine a predetermined relation between cell density and system energy efficiency based on each of the system energy efficiency measurements.

(4). The apparatus according to (3), wherein the target-density determining device is configured to select a corresponding predetermined relation according to the determined system energy efficiency measurement, and to calculate, according to the predetermined relation, the cell density with the highest system energy efficiency as the target density.

(5). The apparatus according to (1), wherein the network state comprises at least one of: network capacity, network error rate, frame usage rate and user density.

(6). The apparatus according to (5), wherein the system-energy-efficiency-measurement determining device is configured to select energy per bit EPB as the system energy efficiency measurement when busyness degree of the network is higher than a predetermined level.

(7). The apparatus according to (5), wherein the system-energy-efficiency-measurement determining device is configured to select power per area PPA as the system energy efficiency measurement when busyness degree of the network is lower than a predetermined level.

(8). The apparatus according to (2), further comprising a cell-parameter collecting device configured to collect one or more of: cell transmission power, user density, path loss coefficient and signal interference noise ratio (SINR) threshold.

(9). The apparatus according to (8), wherein the target-density determining device determines the target density in accordance with user density in the system when energy per bit EPB is selected.

(10). The apparatus according to (8), wherein the target-density determining device determines the target density in accordance with a preset SINR threshold in the system when power per area PPA is selected.

(11). The apparatus according to (9) or (10), wherein the target-density determining device determines the target density also in accordance with cell transmission power and path loss coefficient in the system.

(12). The apparatus according to (3), wherein the predetermined relation between cell density and system energy efficiency is obtained by modeling the system by a random geometric method.

(13). The apparatus according to (1) or (2), further comprising; a cell-to-be-adjusted determining device configured to determine a cell to be turned off when the determined target density is lower than the current cell density, and determine a cell to be turned on when the determined target density is higher than the current cell density.

According to another aspect of the present disclosure, a method for controlling cell density in a wireless communication system is provided.

(14). The method for controlling cell density in a wireless communication system, comprising steps of: dynamically selecting, in accordance with a current network state of the wireless communication system, from at least two system energy efficiency measurements for measuring system energy efficiency of the wireless communication system, to determine a system energy efficiency measurement suitable for the wireless communication system; determining a target density of cells in the wireless communication system in accordance with the determined system energy efficiency measurement, wherein with the system energy efficiency measurement, system energy efficiency of the target density is higher than the current system energy efficiency; and initiating a process for adjusting cell operating state, such that the density of cells in service in the adjusted system approaches the determined target density.

(15). The method according to (14), wherein the at least two system energy efficiency measurements comprise energy per bit EPB and power per area PPA.

(16). The method according to (14) or (15), further comprising determining a predetermined relation between cell density and system energy efficiency based on each of the system energy efficiency measurements.

(17). The method according to (16), wherein a corresponding predetermined relation is selected according to the determined system energy efficiency measurement, and the cell density with the highest system energy efficiency is calculated, according to the predetermined relation, as the target density.

(18). The method according to (14), wherein the network state comprises at least one of: network capacity, network error rate, frame usage rate and user density.

(19). The method according to (18), wherein energy per bit EPB is selected as the system energy efficiency measurement when busyness degree of the network is higher than a predetermined level.

(20). The method according to (18), wherein power per area PPA is selected as the system energy efficiency measurement when busyness degree of the network is lower than a predetermined level.

(21). The method according to (15), wherein the target density is determined in accordance with user density in the system when energy per bit EPB is selected.

(22). The method according to (15), wherein the target density is determined in accordance with a preset SINR threshold in the system when power per area PPA is selected.

(23). The method according to (21) or (22), wherein the target density is determined also in accordance with cell transmission power and path loss coefficient in the system.

(24). The method according to (16), wherein the predetermined relation between cell density and system energy efficiency is obtained by modeling the system by random geometric method.

(25). The method according to (14) or (15), further comprising; determining a cell to be turned off when the determined target density is lower than the current cell density, and determining a cell to be turned on when the determined target density is higher than the current cell density.

According to another aspect of the present disclosure, an apparatus for controlling operating state switching of a cell is provided.

(26). The apparatus for controlling operating state switching of a cell, comprising: a communication device configured to receive an indication for adjusting the operating state of a cell from the apparatus according to any one of (1)-(13); and a control device configured to switch the operating state of a corresponding cell in accordance with the indication for adjusting the operating state of the cell.

(27). The apparatus according to (26), the communication device further comprising: a cell-parameter reporting device configured to transmit to the apparatus according to any one of (1)-(13) one or more of cell transmission power, user density, path loss coefficient and SINR threshold of the cell controlled by the apparatus for controlling operating state switching of a cell.

According to another aspect of the present disclosure, a wireless communication system is provided.

(28). A wireless communication system, comprising: the apparatus for controlling cell density in a wireless communication system according to any one of (1)-(13); and the apparatus for controlling operating state switching of a cell according to (26) or (27).

(29). The wireless communication system according to (28), wherein the apparatus for controlling cell density in a wireless communication and the apparatus for controlling operating state switching of a cell are provided or distributed in a base station in the system or in a core network entity.

As an example, each step of the above methods and each of the component modules and/or units of the above apparatuses can be implemented in the form of software, firmware, hardware or combinations thereof. In the case of implementation in the form of software or firmware, programs forming the software for implementing the above-mentioned methods may be installed, from a storage medium or network, onto a computer with dedicated hardware structure (such as a general-purpose computer 1400 shown in FIG. 14) which can execute various functions after various programs are installed.

Figure 14:
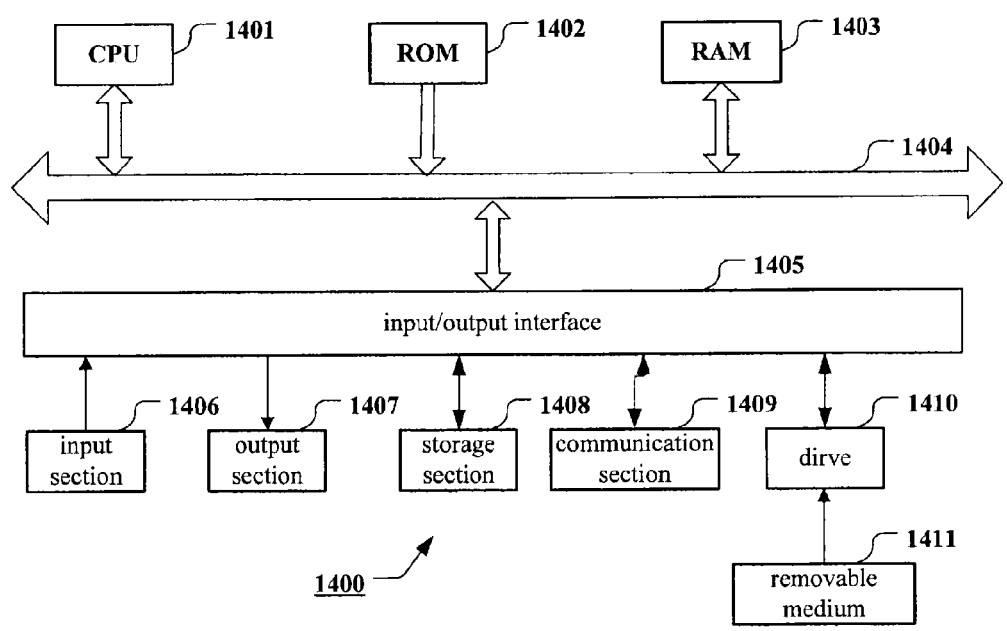
FIG. 14 is a block diagram illustrating an exemplary structure of a computer for implementing the method and apparatus of the present disclosure.

In FIG. 14, a Central Processing Unit (CPU) 1401 executes various processes according to programs stored in a Read-only Memory (ROM) 1402 or programs loaded into a Random-access memory (RAM) 1403 from a storage section 1408. Various data required during different processing made by the CPU 1401 may also be stored in the RAM 1403 as required. The CPU 1401, ROM 1402 and RAM 1403 are linked with each other via a bus 1404. An input/output interface 1405 is also linked with bus 1404.

The following components are linked with the input/output interface 1405: an input section 1406 (including a keyboard, a mouse and the like), an output section 1407 (including a displayer such as a Cathode-ray tube (CRT) or a Liquid-crystal display (LCD), and a speaker), a storage section 1408 (including a hard disk), and a communication section 1409 (including a network interface card, such as a LAN card and a modem). The communication section 1409 performs communication processes via a network such as Internet. As required, a driver 1410 may also be linked to the input/output interface 1405. A removable medium 1411 such as magnetic disc, Compact Disc, magneto-optical disk and semiconductor memory may be installed onto the driver 1410 as required, so that the computer program read from the removable medium 1411 may be installed onto the storage section 1408.

In the case of implementing the above series of processes in the form of the software, the programs forming the software are installed from a network such as Internet or a storage medium such as the removable medium 1411.

Those skilled in the art should understand that, this storage medium is not limited to the removable medium 1411 shown in FIG. 14, on which a program is stored and which is distributed separately from the device to provide the program to a user. The example of the removable medium 1411 includes a magnetic disc (including a floppy disc (registered trade mark)), an optical disc (including a Compact Disc Read Only Memory (CD-ROM) and a Digital Versatile Disc (DVD)), a magneto-optical disc (including a Mini Disc (MD) (registered trade mark)) and a semiconductor memory. Alternatively, the storage medium can be a hard disc etc. included in the ROM 1402, the storage section 1408, on which a program is stored, and the program and the device including the program are distributed to the user together.

The present disclosure also provides a program product with machine readable instruction codes stored therein. The instruction codes, when being read and executed by the machine, may perform the method according to the embodiment of the present disclosure.

Accordingly, the storage medium for carrying the above program product in which the machine-readable indication codes are stored is also included in the disclosure of the present invention. The storage medium includes, but not limited to, a floppy disk, a compact disc, a magneto-optical disk, a memory card and a memory stick.

In the specific embodiments of the present disclosure described above, the feature described and/or illustrated for one implementation may be used in one or more other implementations in a same or similar way, and may be combined with the feature in other implementation, or may substitute the feature in other implementation.

It should be noted that, the term "include/contain" herein means the existence of a feature, an element, a step or a component, and is not intended to exclude the existence or addition of one or more features, elements, steps or components.

In the embodiments and examples described above, the reference numerals consisting of numbers are adopted to indicate each step and/or unit. Those skilled in the art should understand that these reference numerals are for the purpose of illustration and drawing only, and are not intended to indicate the sequence thereof or to be any other limitation.

In addition, the methods of the present disclosure are not limited to be performed according to the time sequence described in the specification, and can be performed in a sequential mode, in a parallel mode or in an independent mode according to other time sequence. Therefore, the technical scope of the present invention is not limited to the implementation sequence of the methods of the present invention.

Although the present invention has been disclosed above by means of the descriptions for the specific embodiments of the present invention, it should to be understood that the above embodiments and examples are exemplary, which are not intended to limit the present invention. Numerous modifications, variations, or equivalents can be made to the present invention by those skilled in the art without deviation from the spirit and scope of the present disclosure. And the modifications, variations or equivalents fall within the scope of the protection of the present disclosure.

The invention claimed is:

1. An electronic device, comprising
circuitry configured to
determine a target density of cells and a target energy efficiency based on current network status; and
control adjusting operating states of a plurality of cells to fit the target density of cells by turning on or turning off at least one of the plurality of cells, wherein
a current density of cells of the plurality of cells is different from the target density of cells, and
the circuitry is configured to change between a first energy efficiency measurement method to calculate a first energy efficiency measurement and a second energy efficiency measurement method to calculate a second energy efficiency measurement based on whether the current network status is busy or not, the target energy efficiency being determined based on the first energy efficiency measurement or the second energy efficiency measurement, the first energy efficiency measurement method being different from the second energy efficiency measurement method.

2. The device according to in claim 1, wherein, the circuitry is further configured to determine the target energy efficiency dynamically based on different one of a plurality of energy efficiency measurement.

3. The device according to in claim 1, wherein, the target energy efficiency is better than a current energy efficiency of the plurality of cells.

4. The device according to claim 1, wherein the current network status is indicated by at least one of: network capacity, network error rate, frame usage rate and user density.

5. The device according to claim 1, wherein the first energy efficiency measurement is energy per bit EPB and the second energy efficiency measurement is power per area PPA.

6. The device according to claim 5, wherein the circuitry is further configured to determine the target energy efficiency based on energy per bit EPB if busyness degree of the network is higher than a predetermined level.

7. The device according to claim 5, wherein the circuitry is further configured to determine the target energy efficiency based on power per area PPA if busyness degree of the network is lower than a predetermined level.

8. The device according to claim 5, wherein the circuitry is further configured to determine the target density of cells and the target energy efficiency based on a predetermined relation between density of cells and energy efficiency corresponding to energy per bit EPB or power per area PPA.

9. The device according to claim 8, wherein the circuitry is further configured to select a predetermined relation corresponding to energy per bit EPB or power per area PPA based on whether the current network status is busy or not, and to calculate, according to the predetermined relation, the cell density with the highest energy efficiency as the target density of cells and the highest energy efficiency as the target energy efficiency.

10. The device according to claim 8, wherein the predetermined relation between cell density and system energy efficiency is obtained by modeling the system by a random geometric method.

11. The device according to claim 1, wherein the circuitry is further configured to transmit a command of adjusting operating states to the plurality of cells.

12. A method for controlling cell density in a wireless communication system, comprising
determining, using circuitry, a target density of cells and a target energy efficiency based on current network status; and
controlling adjusting operating states of a plurality of cells to fit the target density of cells by turning on or turning off at least one of the plurality of cells, wherein
a current density of cells of the plurality of cells is different from the target density of cells, and
the method further comprising changing between a first energy efficiency measurement method to calculate a first enemy efficiency measurement and a second energy efficiency measurement method to calculate a second energy efficiency measurement based on whether the current network status is busy or not, the target energy efficiency being determined based on the first energy efficiency measurement or the second energy efficiency measurement, the first energy efficiency measurement method being different from the second energy efficiency measurement method.

13. The method according to in claim 12, wherein the step of determining a target density of cells and a target energy efficiency based on current network status further comprising determining the target energy efficiency dynamically based on different one of a plurality of energy efficiency measurement.

14. The method according to in claim 12, wherein the first energy efficiency measurement is energy per bit EPB and the second energy efficiency measurement is power per area PPA.

15. The method according to in claim 14, wherein the step of determining a target density of cells and a target energy efficiency based on current network status further comprising determining the target energy efficiency based on energy per bit EPB if busyness degree of the network is higher than a predetermined level.

16. The method according to in claim 14, wherein the step of determining a target density of cells and a target energy efficiency based on current network status further comprising determining the target energy efficiency based on power per area PPA if busyness degree of the network is lower than a predetermined level.

17. The method according to in claim 14, wherein the step of determining a target density of cells and a target energy efficiency based on current network status further comprising determining the target density of cells and the target energy efficiency based on a predetermined relation between density of cells and energy efficiency corresponding to energy per bit EPB or power per area PPA.

18. A non-transitory computer readable medium, comprising program codes thereon when executed by a processor of the computer, cause the processor to perform a method comprising:
determining a target density of cells and a target energy efficiency based on current network status; and
controlling adjusting operating states of a plurality of cells to fit the target density of cells by turning on or turning off at least one of the plurality of cells, wherein
a current density of cells of the plurality of cells is different from the target density of cells, and
the method further comprising changing between a first energy efficiency measurement method to calculate a first energy efficiency measurement and a second energy efficiency measurement method to calculate a second energy efficiency measurement based on whether the current network status is busy or not, the target energy efficiency being determined based on the first energy efficiency measurement or the second energy efficiency measurement, the first energy efficiency measurement method being different from the second energy efficiency measurement method.

19. The device according to in claim 1, wherein the density of cells is a density of the cells which are disposed in a wireless communication system and are in an operating state to provide communication service.

20. The device according to in claim 1, wherein
the target density of cells is a target number of operating cells in an area, and
the circuitry is configured to control adjusting operating states of the plurality of cells to fit the target number of operating cells in the area by turning on or turning off at least one of the plurality of cells, a current number of operating cells in the area being different from the target number of operating cells in the area.

* * * * *